United States Patent [19]

Hayes

[11] 4,398,800

[45] Aug. 16, 1983

[54] MAGNIFYING DEVICE FOR A HAND-HELD IMPLEMENT

[76] Inventor: Jess W. Hayes, 9208 Farmington Dr., Richmond, Va. 23229

[21] Appl. No.: 241,963

[22] Filed: Mar. 9, 1981

[51] Int. Cl.³ .............................................. G02B 7/02
[52] U.S. Cl. ................................... 350/251; 350/243
[58] Field of Search .............. 350/243, 244, 248, 249, 350/251, 114–116; 33/488

[56] References Cited

U.S. PATENT DOCUMENTS

| | | |
|---|---|---|
| 1,179,142 | 4/1916 | Shaughnessy . |
| 1,306,203 | 6/1919 | Tippit . |
| 1,479,885 | 1/1924 | Appler . |
| 1,762,809 | 6/1930 | Bradford . |
| 1,971,519 | 8/1934 | Bradford . |
| 2,455,972 | 12/1948 | Bowditch . |
| 2,732,761 | 1/1956 | Bender et al. . |
| 2,796,803 | 6/1957 | Stegeman ........................ 350/251 X |
| 2,902,761 | 9/1959 | Koenig . |
| 2,905,054 | 9/1959 | Logan ................................ 350/251 |
| 3,011,258 | 12/1961 | Kotchan . |
| 3,428,286 | 2/1969 | Del Pesco ........................... 248/474 |
| 3,655,960 | 4/1972 | Andree ............................ 350/244 X |
| 3,955,884 | 5/1976 | Del Pesco, Sr. ..................... 350/248 |
| 4,316,330 | 2/1982 | Hayes ............................. 350/116 X |

FOREIGN PATENT DOCUMENTS 1073250  9/1954  France ................................ 350/251

*Primary Examiner*—F. L. Evans
*Attorney, Agent, or Firm*—Norman B. Rainer

[57] ABSTRACT

A magnifying glass is supported by a first ball joint connection to a housing suspended by a second ball joint connection from the upper portion of a clamping means. The clamping means is provided at its lowermost extremity with opposed elongated jaws adapted to grip an elongated object such as a pencil. Spring means associated with said clamping means urge said jaws together. A stabilizing post attached to the upper extremity of said clamping means is adapted to rest atop the user's thumb to provide greater steadiness of the implement and attached magnifying glass device.

9 Claims, 7 Drawing Figures

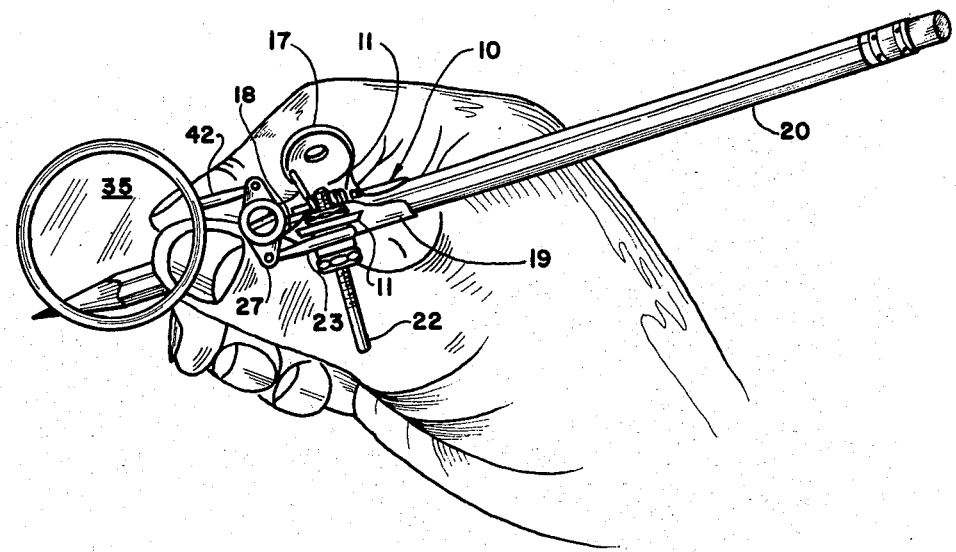
Fig. 1
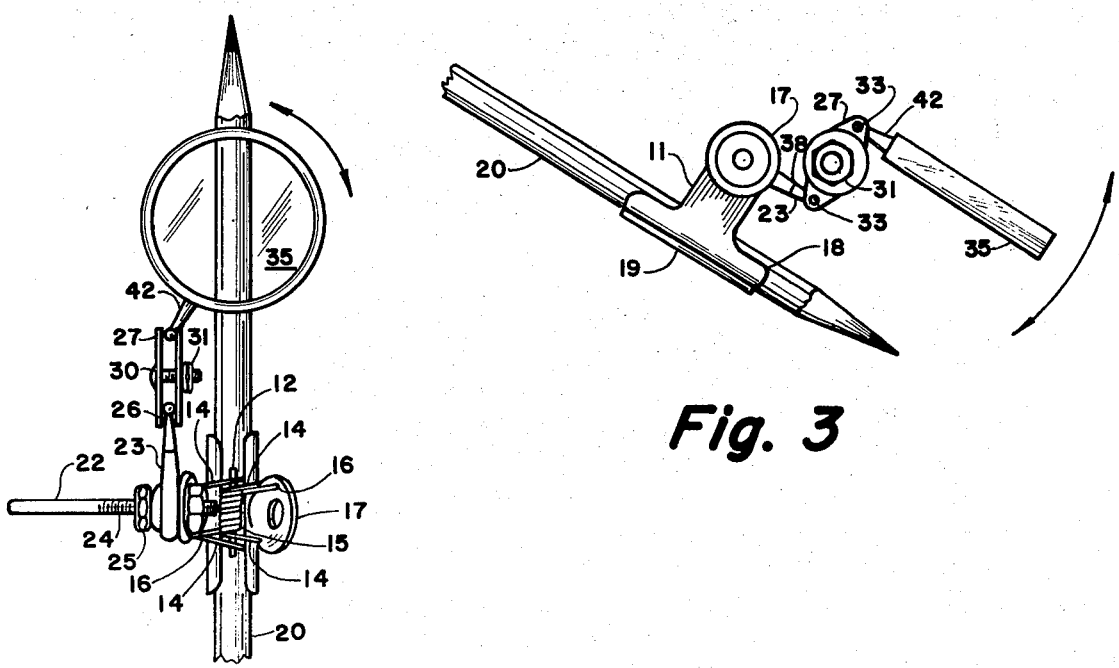
Fig. 3
Fig. 2

MAGNIFYING DEVICE FOR A HAND-HELD IMPLEMENT

BACKGROUND OF THE INVENTION

This invention relates to a magnifying device, and more particularly to a magnifying device adapted for adjustable attachment to a hand-held implement.

It is known to attach magnifying glasses to hand-held instruments such as marking devices and cutting tools to provide to the user an enlarged image of the field of operation of the surface or substrate being worked on. In order for the magnifying glass to provide the sought effect however, the subject surface and the user's eye must be on the optical axis of the magnifying glass. Such alignment is difficult because of the varying orientation and distance of separation the subject surface may have with respect to the user's eye. Although adjustably mounted magnifying glasses have been described for securing such needed optical alignment under diverse conditions of use, the adjusting means have been cumbersome and expensive.

Because magnifying glass devices would be utilized primarily in applications involving close tolerances, the requisite steadiness of hand manipulation becomes a significant problem. Although means for providing stabilizing support to the hand under the implement would be desirable, most such means would interfere with the maneuveability of the implement or may in other ways impair its functionality.

It is accordingly an object of the present invention to provide a magnifying device adapted for adjustable attachment to a hand-held implement.

It is another object to provide an inexpensive device of the aforesaid nature having a magnifying glass capable of positional adjustment.

It is a still further object of this invention to provide a device as in the foregoing object having stabilizing means adapted to interact with the user's hand.

These objects and other objects and advantages of the invention will be apparent from the following description.

SUMMARY OF THE INVENTION

The above and other beneficial objects and advantages are accomplished in accordance with the present invention by an improved adjustable magnifying device which comprises spring-operated clamping means having opposed jaws adapted to engage an elongated shaft of uniform cross-section, stabilizing means attached to said clamping means and extending substantially perpendicularly therefrom, balljoint attachment means attached to said clamping means, and a magnifying glass suspended from a site in its outer periphery by engagement with said balljoint attachment means in a manner which disposes said magnifying glass forwardly and above said jaws.

BRIEF DESCRIPTION OF THE DRAWING

For a fuller understanding of the nature and objects of the invention, referral should be had to the following detailed description taken in connection with the accompanying drawing forming a part of this specification and in which similar numerals of reference indicate corresponding parts in all the figures of the drawing:

FIG. 1 is a perspective side view of an embodiment of the magnifying device of this invention shown in engagement with a pencil and held in operational position in a user's hand.

FIG. 2 is a top view of the device of FIG. 1 showing the magnifying glass in a forwardly displaced position.

FIG. 3 is a view of the side of the device opposite to the side most visible in FIG. 1 and showing the magnifying glass in an upwardly displaced position.

DESCRIPTION OF THE PREFERRED EMBODIMENTS

Figure 4:
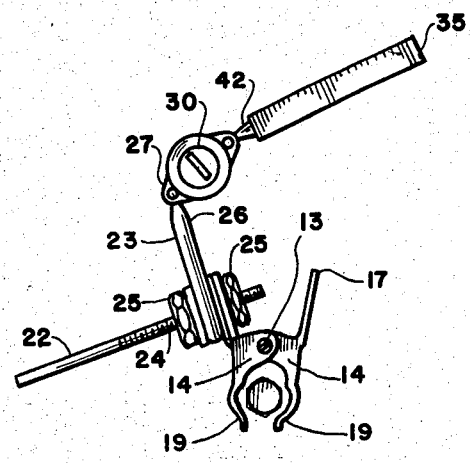
FIG. 4 is a rear view of the device of FIG. 1.

Referring to FIGS. 1-4, a magnifying device of this invention is shown comprised of clamping means 10 comprised of opposed integral members 11 interengaged by pivot pin 12 which passes through apertures 13 in aligned paired shoulders 14 which are continuous extensions of members 11. A coil spring 15 having tangential straight ends 16 is positioned on pivot pin 12 in a manner such that said straight ends 16 bear against opposite members 11 at sites above pivot pin 12. In this manner, the upper portions 17 of integral members 11 are forced apart about pivot pin 12.

The lowermost extremities 18 of said integral members 11 are provided with elongated opposed jaws 19 adapted to enclasp an elongated object of uniform cross-section such as pencil 20, or other object of generally cylindrical or prismatic configuration. The length of jaws 19 is preferably between one and two inches, thereby enabling the jaws to fit in the space between the user's gripping fingers and the knuckle of the index finger adjacent the palm, where the pencil rests against the hand. Because of the nature of the pivoted interengagement of the integral members, the jaws are forced together by virtue of the action of spring 15. Also, the upper portions 17 of integral members 11, when manually squeezed together, serve as means to counteract the action of the spring, thereby releasing the jaws.

A stabilizing rod 22 is attached to the upper portion of one of said integral members and extends substantially perpendicularly therefrom in a plane that bisects said jaws. The length of said rod is between about 1 and 3 inches, which is sufficient to enable the rod to rest atop the user's thumb when the device is attached to a writing instrument held in operative position.

An extension arm 23 is attached by means of threaded bolt 24 and nuts 25 to the upper portion of that integral member which supports said stabilizing rod in a manner permitting rotative positional adjustment of arm 23 about bolt 24. The distal, unsupported portion of bolt 24 serves as stabilizing rod 22. The distal, unattached extremity 26 of arm 23 is provided with a thinned conically tapered section 38 terminating in a ball 34 integral therewith; as shown in FIG. 5.

Figure 5:
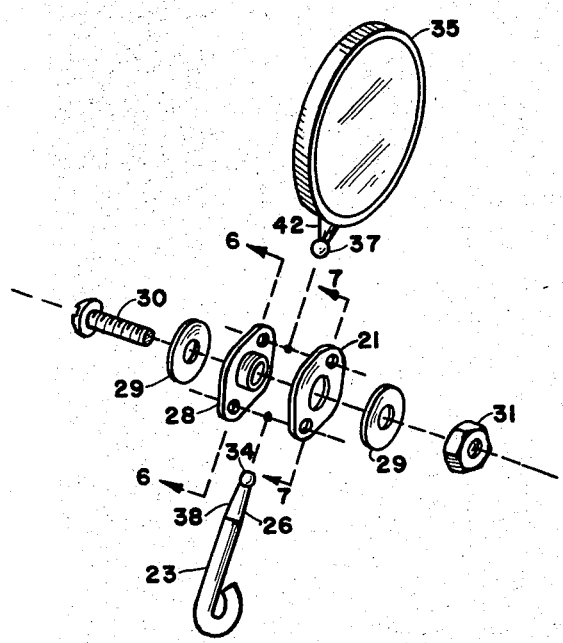
FIG. 5 is an exploded perspective view of the balljoint attachment of FIG. 1.
Figure 6:
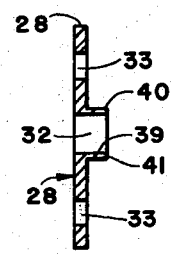
FIG. 6 is an enlarged sectional view taken along the line 6—6 of FIG. 5.
Figure 7:
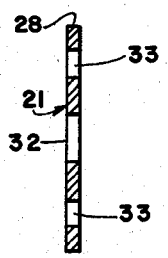
FIG. 7 is an enlarged sectional view taken along the line 7—7 of FIG. 5.

A balljoint housing 27, shown most clearly in FIG. 5 is comprised of juxtaposed friction plates 28 and 21 having centered assembly apertures 32 and surrounding smaller apertures 33, washers 29 disposed on the outer faces of said plates, bolt 30 which passes through said assembly apertures and washers, and nut 31 which engages bolt 30 to draw the assembly together. As shown in FIG. 6, friction plate 28 is provided with a spacing collar 39 integral with said plate and centered about aperture 32. The upper edge 41 of spacing collar 39 is adapted to abut with the inside face of friction plate 21, thereby establishing the spacing between said juxtaposed friction plates. The diameter of apertures 33 and the spacing between the inside faces of said plates are smaller than the diameter of ball 34. Accordingly, one opposed pair of apertures 33 serves to confine ball 34 in a ball-and-socket type of pivoted engagement. As will be shown hereinafter, the other pair of apertures 33 serve a similar function in the retainment of a magnifying glass.

Magnifying glass 35 is provided with stem 42 extending radially from the outer perimeter of said magnifying glass. Said stem is conically tapered to a reduced thickness adjacent its distal extremity and terminates in a ball fitting 37 integral therewith. Said ball fitting is engaged by a pair of apertures 33 in a manner to permit rotational movement of said magnifying glass about a diameter thereof extending through ball fitting 37, and swinging movement wherein the line extending from ball fitting 37 to the opposite extremity of said magnifying glass within the center plane thereof becomes the radius of said swinging movement as shown by the arrows in FIG. 3. Because the position of the magnifying glass is determined by adjustment of two ball and socket connections spaced apart in series within housing 27, the distance of the magnifying glass from the subject can be varied without repositioning the jaws. The high point in the subject-to-magnifying glass distance is illustrated by the position of the magnifying glass in FIG. 3 for a given position of extension arm 23. The lowermost position of the magnifying glass would be achieved when the apertures are again in vertical alignment with the magnifying glass positioned below arm 23.

The two sequentially acting ball and socket connections further permit positioning to the magnifying glass in a direction transverse to balljoint housing 27 as shown by the arrows in FIG. 2. The degree of such transverse movement of extension arm 23 and stem 42 within housing 27 is dependent upon the diminished diameter of the thinned, tapered sections of said arm and stem in comparison to the diameters of their respective ball fittings. Although the extent of transverse movement of the arm and stem is individually somewhat restricted, the cumulative effect produced by the two joints acting additively in concert produces an appreciable range of transverse movement.

It is evident that, with minor adjustment, the device of this invention may be used in either the right hand or left hand.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An adjustable magnifying device for a hand-held implement comprising clamping means having opposed elongated jaws shaped in a manner to enclasp an elongated shaft of uniform cross-section, stabilizing means attached to said clamping means and extending substantially perpendicularly therefrom, balljoint attachment means pivotably held by said stabilizing means, and a magnifying glass suspended from a site in its outer periphery by engagement with said balljoint attachment means in a manner which disposes said magnifying glass above said jaws.

2. The device of claim 1 wherein said clamping means is comprised of a pair of opposed pivotably interconnected integral mambers having upper and lower portions, said upper portions being forced apart by spring means.

3. The device of claim 2 wherein said stabilizing means and balljoint attachment means are associated with an upper portion of the same integral member.

4. The device of claim 2 wherein a support arm is attached by a bolt in adjustably pivotable manner to the upper portion of one of said integral members, the unattached extremity of said arm having a conically thinned section terminating in a ball fitting integral with said arm.

5. The device of claim 4 wherein said balljoint attachment means provides two spaced apart ball-and-socket connections, one of said connections supporting said magnifying glass, and the other connection supporting said balljoint attachment means from the ball fitting of said support arm.

6. The device of claim 1 wherein said magnifying glass can be rotated about a diameter thereof while supported by said balljoint attachment.

7. The device of claim 4 wherein said magnifying glass can be positioned transversely to said balljoint attachment means by the cumulative effect of said two ball-and-socket connections acting additively.

8. The device of claim 4 wherein said stabilizing means is an integral extension of said bolt.

9. The device of claim 4 wherein the distance of said magnifying glass from said jaws may be varied between two parallel positions of said magnifying glass by rotative movement of said magnifying glass about said two spaced apart ball-and-socket connections.

* * * * *